United States Patent [19]
Symonds et al.

[11] 3,851,530
[45] Dec. 3, 1974

[54] VOLUMETRIC MEASURING SYSTEM
[75] Inventors: James Arthur Symonds, Penfield; Howard Randall Jaquith, Rushville, both of N.Y.
[73] Assignee: Sybron Corporation, Rochester, N.Y.
[22] Filed: Feb. 9, 1973
[21] Appl. No.: 331,269

[52] U.S. Cl. ..................... 73/395, 73/392, 73/420
[51] Int. Cl. .............................................. G01l 7/00
[58] Field of Search ............ 73/392, 395, 420, 418, 73/432 A; 285/138, 334.4, 354; 138/44

[56] References Cited
UNITED STATES PATENTS
2,679,411    5/1954   Moore ............................ 285/334.4
2,841,984    7/1958   Green ................................. 73/395
3,311,131    3/1967   Zahuranec ........................... 73/392

*Primary Examiner*—Donald O. Woodiel
*Attorney, Agent, or Firm*—Theodore B. Roessel; Joseph C. MacKenzie

[57] ABSTRACT

A sealed tube system solidly filled with liquid. One end of the system is elastically deformable by pressure, which deformation is transmitted by the liquid to the other end, which elastically deforms likewise. A thimble and socket connection provides for disconnecting and reconnecting the two ends of the system. The thimble is externally threaded and connected to a rigid base by capillary tubing. An internally and externally threaded sleeve, screwed on to the thimble and fixed to the base, encloses the thimble and tubing.

7 Claims, 2 Drawing Figures

VOLUMETRIC MEASURING SYSTEM

RELATED APPLICATION

Indentically entitled copending application for U.S. Letters Pat. of Howard Randall Jaquith. Ser. No. 331,270, filed concurrently with the present application.

BACKGROUND OF THE INVENTION

This invention relates to volumetric measuring systems. Basically, these are sealed envelopes solidly filled with substantially incompressible liquid. The envelope is generally rigid, but has one or more elastic parts which will respond to changes in internal pressure of the liquid by deforming in proportion to such changes. If there is but one elastic part, change in internal pressure may be due to thermal expansion of the liquid, in which case the system provides a well-known type of thermometer. If there are two elastic portions, pressure to be measured may be applied to one elastic portion, in which case the system provides a well-known pressure gauge, because the other portion deforms correspondingly to provide a signal which quantitatively represents the pressure to be measured.

These systems are often called volumetric systems, since they use a fixed mass of liquid in a volume which is supposed either to remain fixed, or, if variable, to exhibit a fixed defined range of variation. The art pertaining to these systems has developed a high degree of reliability and accuracy for the uses to which these systems are put.

A basic problem, which the prior art does not appear to have solved, is that if the envelope is ruptured, unsealed, or the equivalent, it is normally not possible to repair or restore the system without rebuilding it entirely. This prevents systems from being repaired in the field, and ordinarily the user cannot repair the system at all, but must return it to its maker for repair. Consequently, damage to a part of a system requires replacing the whole system. In prior art pressure measuring systems, the usual damage is to a pressure sensing diaphragm portion which by itself might be easily and inexpensively replaced. Unfortunately, either the damage ruptures the diaphragm, or replacing it would unseal the system, so the whole system has to be replaced by one in working order.

The above-identified Jaquith application discloses and claims a solution for the aforesaid problem, said solution being to provide a system of this sort with a thimble and socket connection constructed so as to provide for such connection and reconnection without quantitatively affecting the operation of the system.

SUMMARY OF THE INVENTION

In the present invention the thimble is rigidly secured to the signal portion, and the socket, which terminates one end of the capillary tube, is clamped to the thimble with such force as to strain the material of the thimble and socket to create an area of mutual contact around registering openings in the thimble and socket.

Because the thimble is rigidly secured to the signal portion, the stress due to applying clamping force is absorbed by the signal portion. Thus, the signal portion includes a rigid metal base to which the thimble is connected by a short section of capillary tubing, and by a rigid member which prevents application of clamping force from straining or distorting the capillary tubing section. In particular, the rigid member is preferably a metal sleeve enveloping thimble and capillary tubing section, and having one end rigidly fixed, as by welding, to the base. The thimble is prevented from displacement along the sleeve, as by a threaded joint between it and the sleeve. Further, clamping force is exerted by means of the threaded joint so as, to force the socket on to the thimble. Accordingly, the threaded joint substantially rigidly supports the socket against translation along the sleeve, the torque involved being isolated from the capillary tubing section by the slippage between thimble and socket.

DESCRIPTION OF THE PREFERRED EMBODIMENT OF THE INVENTION

Figure 1:
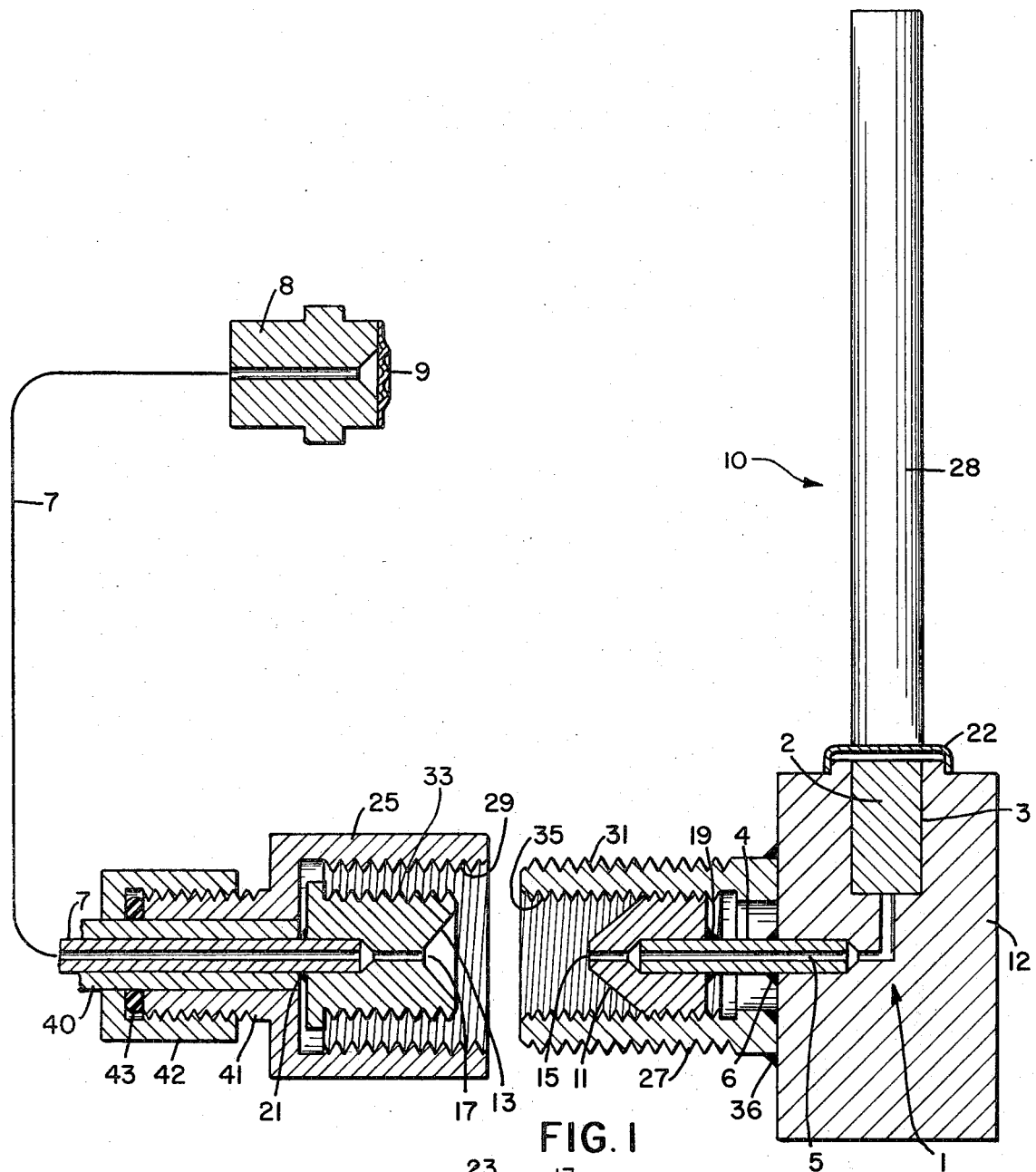
FIG. 1 is a plan view, partly in section, of a volumetric pressure measuring system, which is the preferred embodiment of the invention.

In FIG. 1, reference numeral 10 denotes a pressure transmitter forming one end of a volumetric pressure measuring system. Transmitter 10 constitutes the signal portion of the invention since angular position of, or torque exerted by, its beam 28 may be taken as a signal representative of the magnitude of the difference between fluid pressure acting on the upper side of its sealing diaphragm 22 and the fluid pressure acting on the lower side of diaphragm 22. Transmitter 10 is substantially identically the transmitter disclosed and claimed in U.S. Letters Pat. No. 3,600,952 of Howard R. Jaquith, so we will further describe its function or structure herein only to the extent such function and structure relates to the volumetric system according to the invention, and/or is modified in consequence thereof.

Body member or base 12 is a relatively massive block of stainless steel, or the like, having a right angle bore 1 therein providing a continuous passage therethrough from the left side of base 12 to the upper side thereof. A plug 2 substantially fills the vertical leg of the bore, but nevertheless provides a substantially annular bore 3 opening under the lower surface of the diaphragm. The horizontal leg of the bore 1 is substantially filled by a short section 4 of capillary tubing, so that the lower portion of bore 1 is mainly the bore 5 of the tubing. The intermediate portion of bore 1, which joins bores 3 and 5, is of reduced dimensions with respect to the other portions thereof.

Section 4 is welded peripherally, as indicated at 6, to the surface of base 12 about the opening of bore 1 therein. Diaphragm 22 hermetically seals the upper end of bore 1. Consequently, as disclosed in the aforesaid patent, if fluid under pressure, differing in magnitude from that of the pressure acting on the outside of diaphragm 22, is admitted to the underside of diaphragm 22 via bore 1, then beam 28 will deflect in an amount proportioned to the difference in the magnitude of the two pressures, and in a sense corresponding to the sense of said difference. Such deflection, then, is a signal that may be taken as representing the magnitude of internal pressure of the liquid in the bores 1, 3 and 5.

In order to reduce temperature sensitivity, among other reasons, the bore structure just described is, as usual, intended to minimize the volume of fluid that can be contained within base 12, between the left-hand end of section 4 and the underside of diaphragm 22. In addition, if desired, the plug 2 may be constructed of a material having a lesser temperature coefficient of thermal expansion than the material of base 12. Hence, if the fluid pressure is that of a solid fill of, say, mercury, then, as temperature increases, the volume of bore 3 will increase at a greater temperature rate than elsewhere in the system and thus compensate for the mercury's volumetric increase with increasing temperature.

The rest of the structure, of which the volumetric system essentially consists, is capillary tubing 7, plug 8, and diaphragm 9. These are only sketchily shown, as tubing 7 is simply and in effect an extension of section 4, but much longer, and plug 8 and diaphragm 9 are a counterpart of base 12, diaphragm 22, and the bores of base 12. Thus, plug 8 has an internal bore, one end of which is hermetically closed by diaphragm 9, and the other end of which has an end of tubing 7 hermetically secured therein. Like the base 12 and diaphragm 22, the internal liquid-filled volume in the plug and under the diaphragm 9 is minimized. The difference is that plug 8 and diaphragm 9 provide the sensing portion of the system, as it is intended that diaphragm 9 be exposed to the pressure to be measured, as by using plug 8 as a fitting piercing the wall of a vessel containing fluid under pressure, with diaphragm 9 exposed to such fluid. While tubing 7 is shown with a plain bore, it may be of the kind having a wire, or like filler, in the bore and coextensive therewith, for reducing bore volume to a minimum. Like plug 2, such wire may also be made of material the volumetric temperature expansion of which compensates for the effect on net bore volume, due to volumetric temperature expansion of the tubing and liquid therein.

It is evident that the aforesaid signal and sensing portions, and the capillary tubing 7 which interconnects them, define a sealed envelope. In use, the internal volume of bores, etc., of this envelope is solidly filled with liquid which preferably at all times in the usual conditions of use has an internal pressure stressing the material of the envelope. Further, the envelope, except for diaphragms 9 and 22, is constructed to be essentially rigid. It will therefore be seen that ordinarily the position of, or the torque exerted by, beam 28 will indicate the difference between the pressure on the exterior of the diaphragm 22 and the pressure on the exterior of diaphragm 9, and in fact the mercury in the envelope is in effect a rigid link between the diaphragms.

For the purpose set out in the aforesaid copending Jaquith application, a separable connection is provided between the sensing and signal portions of the system, which connection may be interrupted to allow replacement of the damaged portion of the system. Thus, tubing 7 and section 4 are separably joined by a thimble 11 and a socket 13. The thimble and socket are of conventional convex and concave form (for instance, conical, as shown), except that the contours of these forms are deliberately mismatched by making the slope of the convexity of thimble 11 steeper than the concavity of socket 13. Also, the top of the thimble is flattened, that is to say, in effect, the slope of the convexity is less steep at the inner end of the thimble than the outer end of the thimble. The idea is to provide for the thimble surface contacting the socket surface only in a limited annular region at the apices of thimble and socket.

Figure 2:
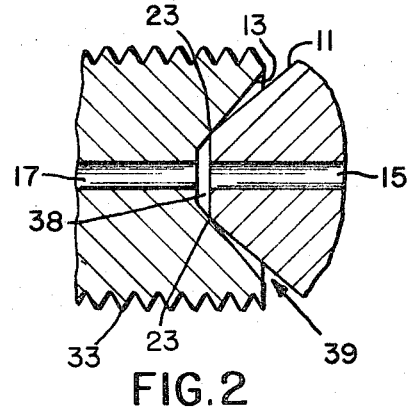
FIG. 2 is a cross-section, enlarged, of a detail of FIG. 1.

Thimble and socket have bores 15 and 17, enlarged at one end to receive respective ends of section 4 and tubing 7, which are sealed to the thimble and socket by suitable welds 19 and 21, like weld 6 seals section 4 in base 12. It is intended that the thimble and socket mate together as shown in FIG. 2, namely, they interengage under sufficient force that the periphery of the flattened tip of thimble 11 bites into the corresponding surface, and in any event, as indicated at 23, straining the material in contact to such extent that an hermetic metal to metal seal is established throughout an annular area about the opposing registering openings of bores 15 and 17.

In accordance with the present invention, thimble 11 acts through a right cylindrical sleeve 27 in order to exert the clamping force interengaging the thimble and socket. As indicated at 33 and 35, respectively, socket 13 is externally threaded and sleeve 27 is internally threaded so that after section 4 has been welded to base 12 and thimble 11 has been welded to section 4, (prior to welding section 4 to base 12) the sleeve 27 can be threaded on to the thimble for enough so that periphery of the right hand end of the sleeve is flush with left hand face of the base 12. As indicated at 36, the sleeve 27 is welded flush to the base 12 so that it forms a rigid integral part thereof in effect.

The sleeve 27 is assembled to the base before the socket 13 is assembled to the thimble 11. The socket is then inserted in the left-hand end of the sleeve, and threaded into and along the sleeve in order to drive the socket on to the thimble. After thimble and socket are in contact, sufficient torque is applied to the socket to create the interengagement condition shown in FIG. 2. A protective ring or cover 25, internally threaded, as indicated at 29, for engaging external threads 31 on sleeve 27, preferably is also provided.

The threaded joint between the thimble and sleeve 27 prevents translation of the thimble along the sleeve. Further, such torque as is applied to the thimble when assembling the socket to the thimble, has to be transmitted through sliding engagement between socket and thimble. Consequently, substantially no twisting or compressive stresses are felt by section 4, or its terminations in base 12 and the thimble. Accordingly, the connection of the thimble to base 12 is fully protected from such stresses as are expected to be encountered during use and assembly of the system.

Customarily, tubing 7 will be provided with flexible protective armor 40 terminated at each end by a suitable gland, e.g., ring 25's reduced threaded end 41 and the clamping ring 42, which together with a flexible washer 43 provide a sort of stuffing box, which prevents undue localization of stress at the weld 21. It is to be observed the tubing 7 is relatively long — yards long, for example, whereas, section 4 is relatively short — an inch or so, for example.

Various modifications may be made in the invention. For instance, the ring 25 could be used to clamp the thimble and socket together. Again, it would be possible to reverse the relative positions of thimble and socket. However, where, as is usually the case, the signal portion of the system is much more expensive than the sensing, and is seldom damaged such as to unseal the system, it is preferable for it to have the thimble, because the wear and tear on a socket due to the clamping condition shown in FIG. 2 is much worse than on a thimble, so the former will become too worn to make a good seal to a thimble, long before a thimble will become too worn to make a good seal to an unworn socket.

Having described our invention in accordance with the statute, we claim:

1. In a volumetric measuring system having a sealed envelope solidly filled with substantially incompressible liquid, wherein said envelope includes a sensing portion responsive to a condition for causing the internal pressure of said liquid to correspond to said condition, wherein said envelope includes a signal portion responsive to said internal pressure for producing a signal corresponding to said internal pressure, wherein said envelope includes a capillary portion for transmitting internal pressure changes between said sensing and signal portions;

wherein said capillary portion has a thimble and a socket each forming a part of said capillary portion, and there being a base, said thimble having means connecting it to said base;

the improvement wherein there is a rigid member rigidly fixed to said thimble and, independently of said means, also to said base, and said socket and said thimble being forcibly interengaged for urging said thimble and socket into contact with each other with such force as to strain the material thereof continuously throughout a given area of mutual contact, said thimble and socket each having a capillary passage having openings within said area and registering with one another for defining the thimble and socket parts of said capillary portion.

2. The invention of claim 1, wherein said base is part of said signal portion.

3. The invention of claim 1, wherein means including threads interengage said thimble and said rigid member.

4. The invention of claim 1, wherein means including threads on said thimble and on said rigid member forcibly interengage said thimble and the said rigid member, the said rigid member being a sleeve enveloping said thimble.

5. The invention of claim 1, including a capillary passage element having one end fixed to said base, and its other end to said thimble, and providing an extension of said capillary passage of said thimble, said means including said element.

6. The invention of claim 1, wherein said rigid member is a sleeve having internal threads and external threads, said thimble being within said sleeve and having external threads interengaged with said internal threads of said sleeve, said thimble being connected to said base by a capillary passage element within said sleeve, said means including said element.

7. The invention of claim 6 wherein said base is a part of said signal portion.

* * * * *